June 7, 1955 F. H. MUELLER ET AL 2,710,163
GAS PRESSURE REGULATOR
Filed Oct. 23, 1951 2 Sheets-Sheet 1

INVENTORS
Frank H. Mueller
Earl E. Tinker
Robert L. Rhodes
BY Cushman Darby Cushman
ATTORNEYS

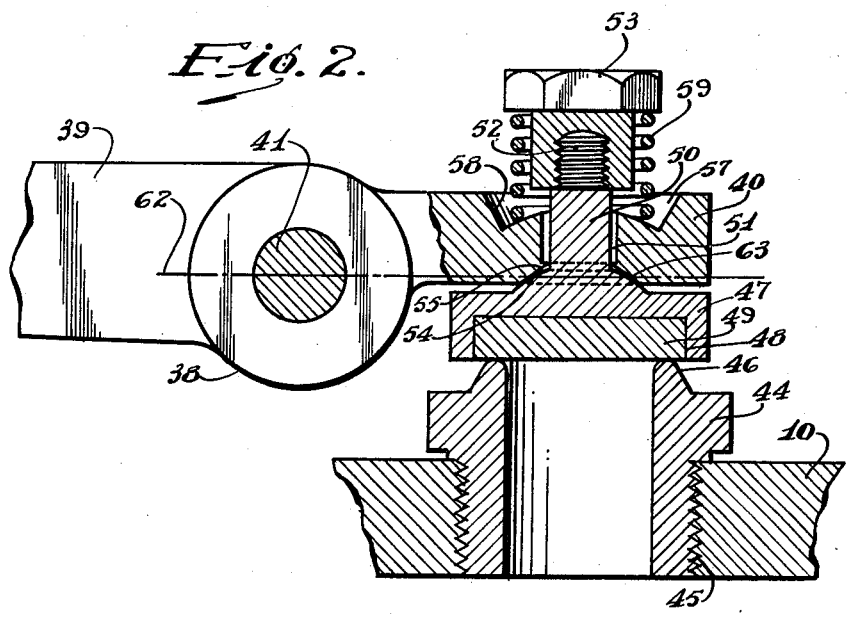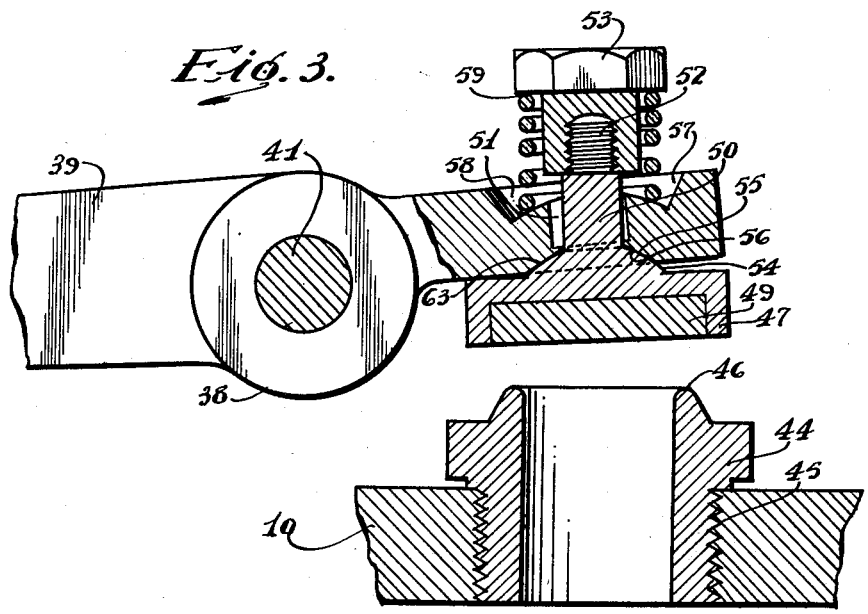

United States Patent Office

2,710,163
Patented June 7, 1955

2,710,163

GAS PRESSURE REGULATOR

Frank H. Mueller, Earl E. Tinker, and Robert L. Rhodes, Decatur, Ill., assignors to Mueller Co., Decatur, Ill., a corporation of Illinois Application October 23, 1951, Serial No. 252,705

5 Claims. (Cl. 251—85)

The present invention relates to fluid pressure regulators and more particularly to an improved valve assembly for controlling the flow of fluid into and through a regulator.

In valves of this character it is extremely important when the valve is moved to its closed position, to have the seating face of the valve align itself in substantially the same plane as the valve seat in order to reduce to a minimum frictional contact of the valve with its seat and so that the valve may be operated by the application of the least amount of lock-off force. Heretofore, it has been customary for the seat engaging portion of the control valve to slide on the valve seat in order to align itself in proper closed position. Due to the high coefficient of friction between the composition or material of the seating face of the valve and the metal valve seat, a relatively high application of lock-off force or pressure has to be applied to operate the valve. This is because the pivot point about which the control valve turns is either above the plane of the valve seat face or not in the plane through the center of the operating lever pivot and therefore this valve is not parallel with the seat when the valve is moved to its closed position. As a result, not only is a relatively high lock-off force necessary to operate the valve but such a construction is further objectionable in that it increases the frictional contact due to sliding of the valve on its seat.

Accordingly, an important object of the present invention is to provide a simple, efficient and economical valve seat assembly having means for reducing to a minimum and practically eliminating the sliding of the seat engaging surface of the valve or seat washer on the valve seat, when opening or closing the valve, and which insures the control valve properly aligning itself with the valve seat by the application of the least amount of force, thus requiring the lowest possible lock-off load.

Other objects and advantages of the invention will become apparent from the following description when taken in conjunction with the accompanying claims and drawings.

Referring to the drawings in which is shown a preferred embodiment of the invention:

Figure 2 is an enlarged detailed sectional view showing the inlet control valve in its closed position;

Figure 3 is a view similar to Figure 2 showing the valve in its open position.

Figure 1:
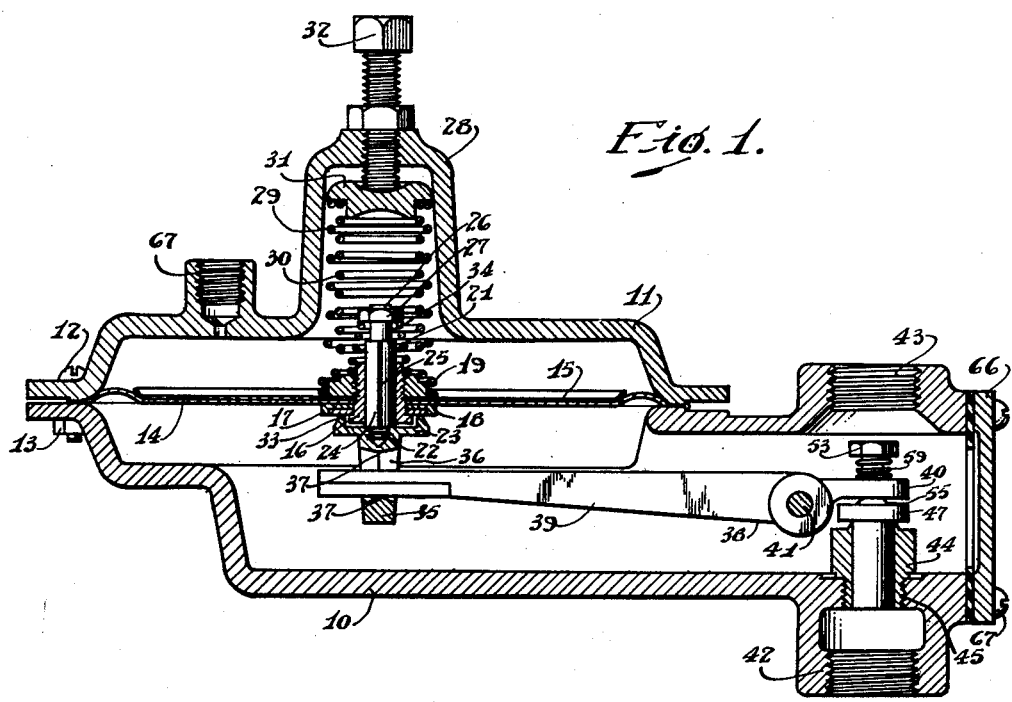
Figure 1 is a vertical longitudinal sectional view of a fluid pressure regulator provided with a valve assembly constructed in accordance with the present invention.

Referring to the drawings in which like numerals designate like parts in the several views, 10 indicates the casing of a fluid pressure regulator to which is detachably connected a cover 11 by any suitable means, such as the threaded bolts 12 and nuts 13 (Fig. 1). A flexible pressure responsive diaphragm 14 may be supported by a backing plate 15 and clamped in position between the casing and the cover 11 by the bolts 12. The diaphragm 15 has a central opening through which extends a threaded flange nipple or tubular member 16 arranged to engage on the underside of the diaphragm 14, a metal seat washer 17. Between the washer 17 and the diaphragm is positioned an annular bearing member or cup 18. A retaining nut 19 is threadedly connected as at 20 to the nipple 16. A bolt or stud 21 extends axially through the nipple 16 and is provided at its lower end with a reduced threaded portion 22 arranged to engage a complementary recess in a relief valve member 23. The bolt 21 also has an intermediate cylindrical portion 24 provided with the spaced guide webs 25 that engage the bore of the nipple 16 so as to form axial passages for communicating the portion of the casing 12 below the diaphragm 15 with the portion above the same. The bolt 21 has a reduced threaded upper end 26 to which is connected a retaining nut 27. The cover 11 of the casing is formed with a hollow boss 28 into which extends a pair of inner and outer concentric coiled loading springs 29 and 30 respectively, which at their upper ends engage stop shoulders on the cap or plug 31. The outer coil spring 29 at its lower end abuts the plate 15 while the lower end of the inner spring 30 engages the top of the nut 19. An adjustable threaded screw 32 extends into the boss 28 so as to engage the cap 31 in order to vary the spring pressure applied to the diaphragm 14. The valve member 23 may have a circular lip portion 33 extending upwardly in engagement with the washer 16 so as to normally prevent the escape of fluid from the casing 10 below the diaphragm to the upper part of the casing or cover 11. A coil spring 34 confined between the nut 27 and the nut 19 tends to normally urge and maintain the valve 23 against the washer 16. The depending stem 35 of the valve 23 is formed with a transverse opening 36, the opposed walls of which are provided with the knife edges 37.

An operating lever 38 having a long arm 39 and a short arm 40 is pivotally mounted within the casing 10 by transverse pin 41. The outer end of the arm 39 extends loosely through the opening 36 and is normally maintained in the position as shown in Fig. 1 by the tension of the spring 34. The side of the casing 10 remote from the diaphragm 14 is provided with a fluid inlet port 42 and a vertically spaced aligned outlet port 43. A removable metal valve seat 44 is threaded to the bottom of the casing as at 45 and communicates with the inlet port 42 for conducting fluid, such as gas or the like, under pressure into the casing 10. The upper face of the seat 44 is provided with an annular seating surface 46 arranged to be engaged by a valve 47 for controlling the flow of the fluid into the casing or regulator. The control valve 47 preferably has its bottom provided with an annular recess 48 in which is mounted a valve seating surface 49 of any suitable durable composition or material, so as to provide a tight seal when brought into contact with the metal seat 46. The valve 47 has extended upwardly and centrally therefrom a stem 50 which projects loosely through a vertical opening 51 in the short arm 40 of the lever 38. The stem 50 at its outer upper end terminates in a threaded portion 52 arranged to receive a complementary threaded portion in a retaining nut 53 when the parts are assembled. The stem 30 is connected to the valve 47 by a convex or spherical shoulder 54. The underside of the arm 40 of lever 38 has a conical shaped recess 55, the straight inclined wall 56 of which is in tangential engagement with the convex or ball portion 54 as at 63 (Fig. 2). The top of the arm 40 is also recessed as at 57 and is formed with a convex bottom 58. A coil spring 59 is confined between the head of the nut 53 and the curved bottom 58 of the recess 57 so as to normally urge the curved shoulder 54 of the valve in engagement with the conical wall 56 of the recess 55. The pivotal connection 41 of the lever 38 may be one of either the first or second class, so that actuation of the lever causes the valve 47 to swing in an arc about the pivot 41 when moved to either its closed position (Fig. 2) or to its open position (Fig. 3).

Figure 4:
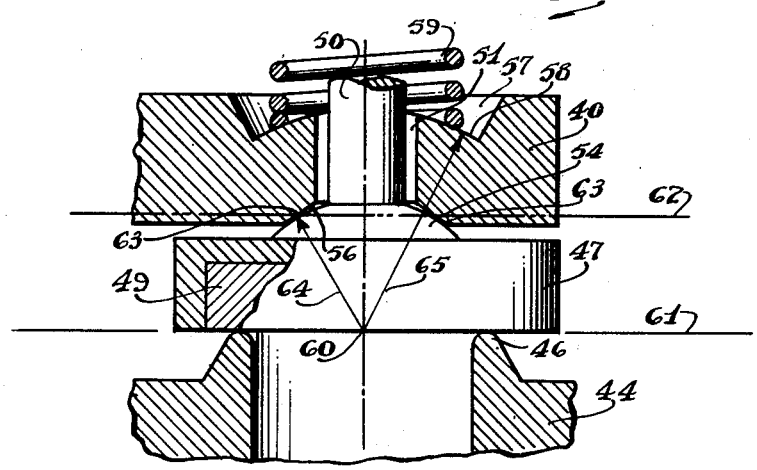
Figure 4 is a detailed view with parts in section of the valve assembly.

It is significant to note that when the valve assembly is in its closed position, such as shown in Fig. 4 of the drawing, the center 60 of pivotal motion of the control valve 47 is in the center of the annular valve seat 46 and is in substantially the same plane as the seat engaging face of the valve 47 as clearly indicated by the line 61 (Fig. 4) thus providing means for reducing to a minimum the sliding of the seating face 49 of the valve on the seat 46. Moreover, the contact of the convex shoulder portion 54 with the conical wall 56 of the recess 55 is in a plane substantially parallel to the seating surface as indicated by the line 62 (Fig. 4) and passes through the center of the lever pivot 41 (Fig. 2). By this novel arrangement of parts the translation or movement of the valve 47 about its pivot 41 is reduced to an absolute minimum. Further, the only frictional forces that the contacting surface of the valve encounters are those occurring at the point of rocking contact of the curved shoulder 54 with the conical wall 56 of the recess 55 (Fig. 4) and the contact of the spring 59 with the curved bottom surface 58 of the recess 57 which is free to slide over this convex surface. The frictional engagement of the convex shoulder 54 with the conical wall 56 of the recess 55 is reduced to a minimum due to the fact that the radius 64 (Fig. 4) of the curved shoulder 54 is as small as possible and the spring 59 contacts with the curved bottom 58 as indicated by the radius 65 (Fig. 4) extending from the same center 60 as the radius 64 thus reducing the friction of the spring 59 with the bottom 58 also to a minimum.

The casing adjacent the valve 47 may be provided with a removable closure plate 66 connected by the screws 67 to the side of the casing adjacent the valve 47 so as to permit convenient access to the interior of the casing. The cover 11 may be formed with a discharge opening 67 (Fig. 1) so as to allow the escape of the fluid that passes through the bolt 21 upwardly into the casing above the diaphragm 14 during the operation of the regulator. It will be seen that by reason of the novel arrangement and mounting of the valve 47 on the arm 40, that simple, efficient and economical means are provided for reducing to a minimum the frictional engagement of the valve 47 with its seat 46, and practically eliminates the sliding of the engaging face 49 on the seat 46 so that the control valve may be moved into proper aligned position with the seat 46 when it is necessary to cut off the flow of the fluid through the inlet port 42, by the application of a minimum amount of force.

The valve assembly may efficiently be used with gas regulators when supplying gas to pilot lights and where it is extremely important that the lock-off load on the regulator be reduced to a minimum. In other words, if this lock-off load is very high and a pilot light is adjusted to a minimum flame when other gas is being used, it may accidentally go out when other gas appliances are turned on, due to the sudden drop in the gas pressure from that to which the gas pilot was originally set. When our valve assembly is associated with such a regulator, the valve 47 is moved into engagement with its seat 46 or away therefrom, in a manner that requires a minimum of frictional or sliding contact of the valve with its seat, with the result that the lock-off force is as low as possible and there is little or no danger of the pilot light going out. In other words, the valve 47 is immediately responsive to the sudden changes of pressure on opposite sides of the diaphragm 14 so as to be moved either in engagement with its seat or away therefrom. Moreover, the concentric arrangement of the convex portions 54 and 58 with each other and with the conical surface 63, insures reducing to a minimum the frictional or sliding contact of the movable engaging parts.

It will be understood that the form of the invention shown and described is merely illustrative of a preferred embodiment and that such changes may be made as come within the scope of the following claims.

We claim:

1. In a fluid pressure regulator, a casing having a fluid inlet port provided with an annular valve seat within the casing, an operating lever pivotally mounted in the casing and having an end portion overlapping the valve seat, said end portion having a through opening and a substantially conical shaped recess on the underside thereof communicating with said opening, a control valve for closing said port, said valve having a stem extending through said opening, said stem having an enlarged convex shoulder extending into said recess so as to movably engage the conical surface with line contact therewith, and means connecting said stem to said lever, the convex shoulder contacting said conical recess in a plane substantially parallel to the valve seat when the valve is closed and passing through the center of the lever pivot to reduce frictional and sliding contact of the valve on its seat to a minimum.

2. In a fluid pressure regulator, a casing having a fluid inlet port provided with an annular valve seat positioned within the casing, an operating lever pivotally mounted in the casing and having an end portion overlapping the valve seat, said end portion having a through opening and a conical recess on the underside thereof communicating with said opening, a valve for closing said inlet port, said valve having a stem extending through said opening, said stem having an enlarged curved shoulder portion extending into said recess for tangentially engaging the conical surface thereof, means for yieldably maintaining the shoulder portion in engagement with said recess, and means for actuating said lever for moving the valve into engagement with its seat, the parts being constructed and arranged so that contact of the curved shoulder portion of the valve stem with said conical recess is in a plane substantially parallel to the seating surface of the valve and passes through the center of the lever pivot when the valve is in its closed position.

3. In a fluid pressure regulator, a casing having a fluid inlet port provided with an annular valve seat positioned within the casing, an operating lever pivotally mounted in the casing and having an end portion overlapping the valve seat, said end portion having a convex upper surface and a conical bottom recess connected by a vertical opening, a valve for closing said inlet port, said valve having a threaded stem extending through said opening, said stem having an enlarged convex shoulder portion concentric with said convex surface and extending into said recess for tangentially engaging the conical surface thereof, a nut threaded to said stem, a coil spring confined between said nut and the convex upper surface of said lever for yieldably maintaining the shoulder portion in engagement with said recess, the convex shoulder and convex surface having a common center of curvature so as to reduce to a minimum the frictional contact of the movable engaging parts, and means for actuating said lever for moving the valve into engagement with its seat.

4. In a fluid pressure regulator, a casing having a fluid inlet port provided with an annular valve seat positioned within the casing, an operating lever pivotally mounted in the casing and having an end portion overlapping the valve seat, said end portion having a convex upper surface and a conical bottom recess connected by a vertical opening, a valve for closing said inlet port, said valve having a threaded stem extending through said opening, said stem having an enlarged convex shoulder portion concentric with said convex surface and extending into said recess for tangentially engaging the conical surface thereof, said convex shoulder contacting the conical recess in a plane substantially parallel to the valve seat when the valve is closed and passing through the center of the lever pivot to reduce sliding of the valve on its seat, a nut threaded to said stem, a coil spring confined between said nut and the convex upper surface of said lever for yieldably maintaining the shoulder portion in engagement with said recess, the convex shoulder and convex surface having a common center of curvature so as to reduce to a minimum the frictional contact of the movable engaging parts, and means for actuating said lever for moving the valve into engagement with its seat.

5. In a fluid pressure regulator, a casing having a fluid inlet port provided with an annular valve seat within the casing, an operating lever pivotally mounted in the casing and having an end portion overlapping the valve seat, said end portion having a through opening and a substantially conical shaped recess on the underside thereof communicating with said opening, a control valve for closing said port, said valve having a stem extending through said opening, said stem having an enlarged convex shoulder extending into said recess so as to movably engage the conical surface with line contact therewith, the center of pivotal movement of the valve when in its closed position, being in substantially the same plane as the seat engaging face of the valve and also in the center of the valve seat to reduce to a minimum the sliding of the valve on its seat, and means connecting said stem to said lever, the convex shoulder contacting said conical recess in a plane substantially parallel to the valve seat when the valve is closed and passing through the center of the lever pivot to reduce frictional and sliding contact of the valve on its seat to a minimum.

References Cited in the file of this patent

UNITED STATES PATENTS

| | | |
|---|---|---|
| 276,003 | Corliss | Apr. 17, 1883 |
| 991,784 | Kiley | May 9, 1911 |
| 1,538,207 | Niedeckin | May 19, 1925 |
| 1,720,673 | Groble | July 26, 1929 |
| 1,890,248 | Edwards | Dec. 6, 1932 |
| 2,165,640 | Marx | July 11, 1939 |

FOREIGN PATENTS

| | | |
|---|---|---|
| 54,200 | Switzerland | Jan. 14, 1911 |
| 336,531 | Germany | May 3, 1921 |